350-317 SR
PFR28 XR 3,816,849

United States Patent [19] [11] 3,816,849
Kinoshita et al. [45] June 11, 1974

[54] METHOD AND APPARATUS FOR PREPARING VECTORCARDIOGRAMS WITH COLORS IN ACCORDANCE WITH DEPTH

[75] Inventors: Shinji Kinoshita; Tadashi Kobayashi, both of Sapporo, Japan

[73] Assignee: Hokkaido University, Sapporo City, Hokkaido, Japan

[22] Filed: Mar. 13, 1972

[21] Appl. No.: 234,199

[30] Foreign Application Priority Data

Sept. 9, 1971 Japan .............................. 46-70124

[52] U.S. Cl. .............................. 358/81, 350/3.5
[51] Int. Cl. .............................. H04n 9/02
[58] Field of Search .............. 178/6.7 A, 6.5, 5.4 D, 178/DIG. 1, DIG. 5, 5.2 R; 350/3.5; 128/2.06 V, 2.06 A, 2.06 G; 340/173 LM

[56] References Cited

UNITED STATES PATENTS

| | | | |
|---|---|---|---|
| 2,730,566 | 1/1956 | Bartow et al. | 178/6.5 A |
| 3,189,683 | 6/1965 | Mullin | 178/6.7 A |
| 3,214,515 | 10/1965 | Eberline | 178/6.7 A |
| 3,317,662 | 5/1967 | Robinson et al. | 178/5.4 R |
| 3,541,233 | 11/1970 | Ayres | 178/5.2 R |
| 3,549,887 | 12/1970 | Hansen | 178/6.7 A |
| 3,614,426 | 10/1971 | Donzeue | 350/3.5 |
| 3,673,317 | 6/1972 | Newell | 178/5.2 R |

*Primary Examiner*—Vincent P. Canney
*Assistant Examiner*—Alfred H. Eddleman
*Attorney, Agent, or Firm*—Chittick, Thompson & Pfund

[57] ABSTRACT

A color vectorcardiogram having spots colored with different colors in accordance with the depth thereby enabling a stereographical diagonosis is prepared by displaying a horizontal vector loop of a vectorcardiograph on the fluorescent screen of a cathode ray tube, photographing the image of the spots of the horizontal vector loop through a tomographic filter or a color filter and coloring with different colors the respective spots of the photographed vector loop in accordance with the vertical scalar of the vectorcardiograph.

11 Claims, 9 Drawing Figures

METHOD AND APPARATUS FOR PREPARING VECTORCARDIOGRAMS WITH COLORS IN ACCORDANCE WITH DEPTH

BACKGROUND OF THE INVENTION

This invention relates to a method and apparatus for preparing a color vectorcardiogram for facilitating diagonosis of hearts.

The purpose of the vectorcardiogram is to provide a stereographical display of a vectorcardiograph for facilitating observation. According to the conventional method, however, the record is made in terms of three-plane vectorcardiograms which are difficult to understand for ordinary clinicians.

SUMMARY OF THE INVENTION

It is an object of this invention to provide a novel method and apparatus for preparing a color vectorcardiogram according to which a single colored plane vectorcardiogram is obtained wherein the spots of the vector loop are colored by different colors according to the difference in height, that is the degree of superior (upper) and inferior (lower) deviations of the spots.

Further object of this invention is to provide a novel color vectorcardiogram projected on the horizontal plane and the successive spots thereof are colored with different colors in accordance with the vertical height thereby enabling a stereographical diagonosis.

Such a color vectorcardiogram is prepared by using a color filter or a tomographic filter.

Generally speaking, the color vectorcardiogram is prepared by the steps of displaying a horizontal vector loop of a vectorcardiograph on the fluorescent screen of a cathode ray tube, photographing the image of the spots of the horizontal loop through a filter and coloring with different colors the respective spots of the photographed vector loop in accordance with the vertical scalar of the vectorcardiograph.

When using a tomographic filter, a cathode ray tube of the monochromatic type is used and the horizontal vector loop of a vectorcardiograph displayed on the fluorescent screen of the cathode ray tube is photographed through a tomographic filter having a plurality of equally spaced apart black stripes to obtain a tomographic vector loop. After shifting the tomographic screen to another two different positions, another two tomographic vector loops are formed in the same manner. Spots of each tomographic vector loop is colored with different colors in accordance with the depth thereof and three colored tomographic vector loops are superposed one upon the other to obtain a continuous color vectorcardiogram.

When using a color screen, a fluorescent screen having a relatively wide wavelength band is selected for the cathode ray tube and a horizontal vector loop of a vectorcardiograph displayed on the fluorescent screen is photographed on a color film through a color filter which is moved in accordance with the vertical scalar of the vectorcardiograph thereby forming a color vector cardiogram having spots colored with different colors in accordance with the depth.

Generally speaking, the apparatus for preparing a vector colorcardiogram of this invention comprises a cathode ray tube having a fluorescent screen, means responsive to the output of a pickup of a vectorcardiograph for displaying a horizontal vector loop of the vectorcardiograph on the fluorescent screen, a photographic camera for photographing the image of the horizontal vector loop, a filter driven by a galvanometer essentially responsive to the vertical component of the output, the filter being located intermediate the fluorescent screen and the photographic camera, and a condenser lens for focusing the image of the horizontal vector loop on the surface of the screen.

Where the filter comprises a tomographic filter, the cathode ray tube is of the monochromatic type and the filter is provided with a plurality of equally spaced apart black stripes.

Where a color filter is used, the fluorescent screen of the cathode ray tube is made to have a relatively wide wavelength band and the filter is provided with a plurality of stripes of different colors which are arranged in parallel close relationship.

DESCRIPTION OF THE PREFERRED EMBODIMENT

Figure 1:
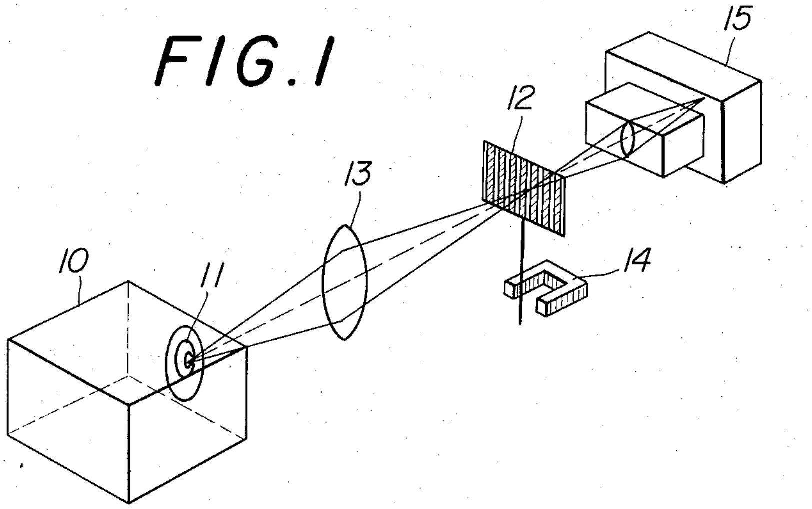
FIG. 1 is a diagrammatic representation of the apparatus utilized to form a color vectorcardiogram.

FIG. 1 of the accompanying drawing is a schematic representation of the apparatus for preparing a color vectorcardiogram wherein several "tomographic" cardiograms are prepared by cutting a vector loop along several planes parallel with the horizontal plane at different depths or heights, coloring the resulting tomographic cardiograms with different colors dependent upon the depths or heights thereof and combining the colored tomographic cardiograms to form a resultant color vectorcardiogram.

As shown in FIG. 1, the images of the spots of a horizontal vector loop 11 displayed on fluorescent screen of a monochromatic type cathode ray tube 10 of a conventional vectorcardiograph are focused on a tomographic filter 12 through a condenser lens 13. The filter 12 is driven by a galvanometer 14 and the images of the spots transmitting through the tomographic filter 12 are photographed by a photographic camera 15.

Figure 2:
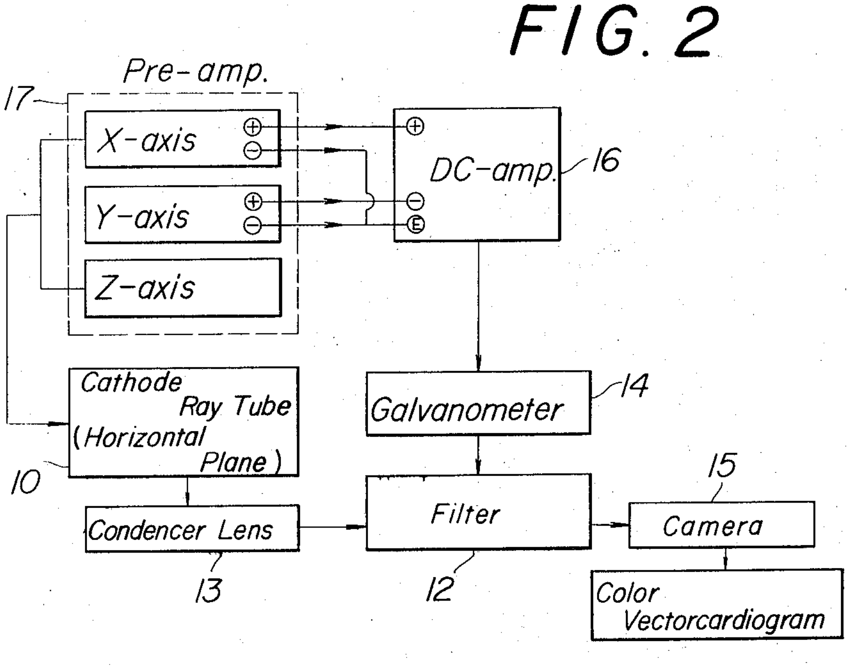
FIG. 2 shows an electric connection diagram of the apparatus shown in FIG. 1.

FIG. 2 shows a connection diagram of the apparatus shown in FIG. 1. The outputs from a pre-amplifier 17 in the vectorcardiograph are supplied to a DC amplifier 16 and also to a horizontal deflection coil of the cathode ray tube 10. The output from the DC amplifier is supplied to the galvanometer 14 for driving the filter in accordance with the vertical scalar.

Figure 3:
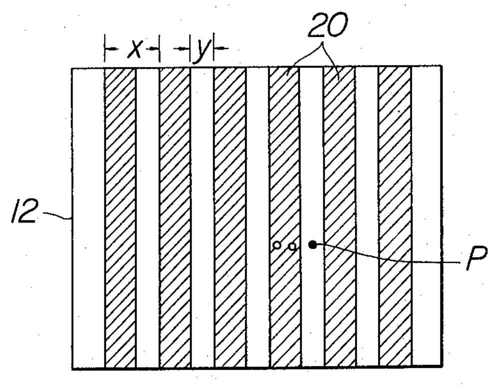
FIG. 3 shows a plane view of a tomographic filter.

One example of the tomographic filter 12 is shown in FIG. 3 and comprises a plurality of spaced apart parallel black stripes 20.

In one example, the distance $X$ between corresponding edges of two adjacent stripes was 6 mm and the distance $Y$ between adjacent stripes was made slightly wider than one third of the distance $X$, that is 2 mm. The rating of the condenser lens 13 was 1:2.8 and $f=$ 130 mm. The distance between the fluorescent screen of the cathode ray tube 10 and the tomographic filter 12 was 52 cm, that is four times of the focal length 130 mm of the condenser lens 13, and the condenser lens was situated at the middle therebetween. In other words, the image on the tomographic filter was made to have equal size as the horizontal vector loop displayed on the cathode ray tube.

The tomographic filter 12 is driven by the galvanometer 14 such that it is moved in accordance with the difference between the movements in the directions of $X$ (horizontal) and $Y$ (vertical) axis. The sensitivity or deflection in the direction of $X$-axis was adjusted such that a magnitude of 1 mV was displayed with the same magnitude both on the cathode ray tube and the tomographic filter. In other words, the sensitivity was adjusted such that movement of a spot on the cathode ray tube does not result in the variation of the position of its image on the filter. On the other hand, the sensitivity or deflection in the direction of $Y$-axis was adjusted such that a magnitude of 1 mV produces an image of 5 mm on the filter whereby the lateral movement of the image on the surface of the filter was governed solely by the movement in the direction of $Y$-axis.

Figure 4:
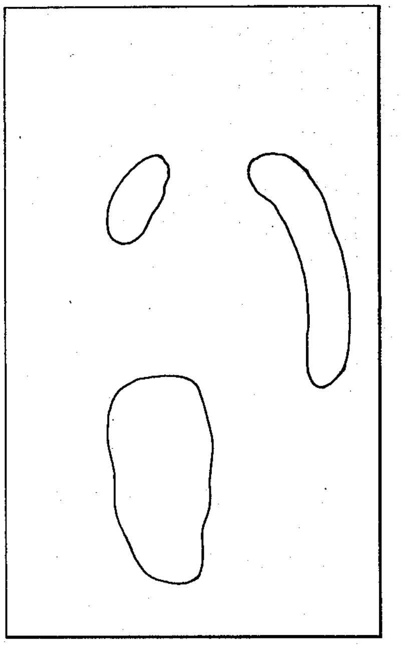
FIG. 4 shows a tomographic vector loop.

In operation, the image of the origin of a vector loop is brought to coincide with one point P marked on the surface of the tomographic filter as shown in FIG. 3 and then the horizontal plane vector loop displayed on the cathode ray tube 10 is photographed by camera 15 through the tomographic filter 12. FIG. 4 shows a typical tomographic vector loop photographed in this manner. Thus, irrespective of the movements in the directions of $X$-axis and $Z$ axis, when a spot on the vector loop moves a definite distance from the origin in the direction of $Y$-axis, the image of the spot is photographed or recorded through the transparent portion of the tomographic filter 12. The tomographic vector loop shows the record of the portions near 0 mV, that is the portions having the same height as the origin and the record of the portions at a depth of about 1.2 mV beneath the origin. Then the tomographic filter is shifted to another two positioned to photograph the image of the horizontal vector loop thereby forming total of three tomographic vector loops. Each of these vector loops is not graduated with a time scale.

When recording these tomographic vector loops, care should be taken of the following problems. One involves the inertia of the tomographic filter which is caused by the weight thereof. To minimise as far as possible the inertia, the image of the vector loop is made small and the filter is constructed small and light weight as far as possible. Further, in order to minimize as far as possible the movement of the filter, the filter is operated such that its movements in the directions of $X$ and $Y$ axes cancel each other. In other words, as above described, since it is designed such that the filter is moved in accordance with the difference $(X - Y)$ in the movements in the directions in $X$ and $Y$-axes, the sensitivity $X$ is adjusted such that the maximum scalar value of $X$ and that of $Y$ will have the same direction and the same magnitude so that the difference $(X - Y)$ approaches zero.

In the vector cardiograph used in this embodiment, since the maximum scalar values of $X$ and $Y$ usually have opposite senses it is necessary to reverse the direction of the $X$-axis. The vector cardiogram is herein described according to the Wilson-Burch method so that the left hand lead wire and the right hand lead wire are usually exchanged to cause the maximum scalar values along $X$ and $Y$ axes to have the same direction. The sensitivity of Y-axis is made equal to $\sqrt{3}$ times of the value mentioned above according to the Wilson-Burch method. Then the vector loop displayed on the cathode ray tube will be enlarged or contracted so that the maximum scalar values of $X$ and $Y$ will have the same sense and the same dimension. In other words, the sensitivities along $X$ and $Y$-axes are enlarged or contracted with the same magnifying power. As above described, the sensitivity along $X$-axis of the filter is varied correspondingly. These operations minimize the movement of the filter, thus minimizing the effect caused by the inertia of the filter. Further, these operations render negligibly small the difference between the movements of the upper and lower portions of the filter which are caused by the fan like movement thereof.

Another problem involved is that it is necessary to take care to produce a continuous loop by recombining three tomographic vector loops. Since, the image of the tomographic vector loop as seen by the camera is relatively small and dark it is advantageous to use a photographic film of high sensitivity, for example, AGFA-PAN, ASA 1000 (white and black), reverse twice the picture with mini copies and then reverse transfer the picture onto a positive film to obtain a tomographic vector loop having a suitable contrast and dimension, as shown in FIG. 4. To eliminate any discontinuously of the loop, following precautions are essential, that is (1) at the time of the firstly photographing the vector loop, three exposures are to be made to provide an overlap exposure, (2) to make the width of the transparent stripes of the tomographic filter to be appreciably wider than one half of the width of the black stripes, and (3) to intentionally use a soft focus at the time of the second reverse transfer. These measures increase the width of the tomographic vector loop thereby minimizing discontinuous portions of the reconstructed loop. Since the vector loop is displayed on the cathode ray tube with its left and right hand sides exchanged, the photographic film is inverted to obtain correct left and right hand side relationship.

Figure 5:
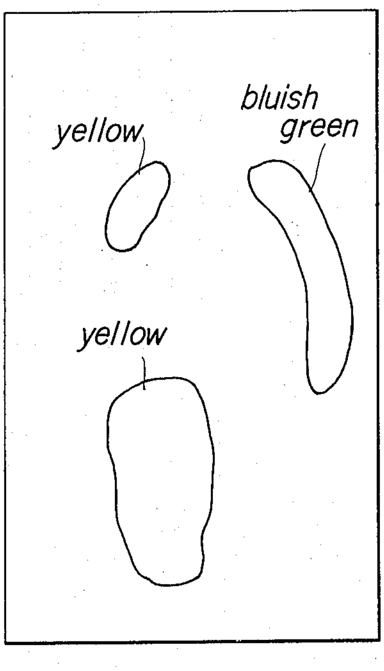
FIG. 5 shows a tomographic vector loop colored in accordance with the depth.

FIG. 5 shows a tomographic vector loop colored according to the depth, in which the depth of O mV is shown by yellow and the depth of −1.2 mV by blueish green. As shown by a graph shown in FIG. 6, it is preferable to represent the height of the origin by yellow, portions higher than the origin (in the direction of head, or portions in the positive direction) by reddish colors whereas deeper portions (in the direction of foot, or portions in the negative direction) by bluish colors. More particularly, portions of +0.8 mV are colored red, portions of +0.4 mV orange, portions of 0 mV yellow, portions of −0.4 mV yellowish green, portions of −0.8 mV green, portions of −1.2 mV blueish green, and portions of −1.6 mV blue. When the $Y$-axis scalar exceeds these regions to reach a value of more than +1.2 mV the vector loop is colored white whereas when the Y-axis scalar decreases below −2.0 mV, the vector loop is colored blueish purple.

Coloring is made by superposing one upon the other the tomographic vector loop and an ordinary horizontal plane vector loop with a time scale, further superposing a plurality of colored cellophane films having different colors dependent upon the depth of the tomograms and by duplicately photographing the assembly with a single color film. The horizontal plane vector loop with a time scale utilized for this purpose can be prepared by photographing the spots of the horizontal plane vector loop displayed on the cathode ray tube on a positive film by substantially the same method and under the same conditions as those described above and then by reversing thereof into a positive film for recording the tomographic vector loop except that the tomographic filter is not used.

Three colored tomographic vector loops prepared in this manner for different depths are combined to obtain a continuous color vectorcardiogram. However, as above described, since the width of respective loops has been increased, at adjoining portions, colors thereof overlap to manifest intermediate color tones. Accordingly, the type of the colors is much larger than that described above. Since overlapped colors and monochromatic colors have different brightnesses, it is necessary to double the exposure time of the monocharomatic portion to correct the difference in the brightness. This corresponds to the correction obtained by covering the portions of the overlapped colors with portions of a tomographic negative film corresponding to the portions on both sides of the monochromatic portion.

Figure 6:
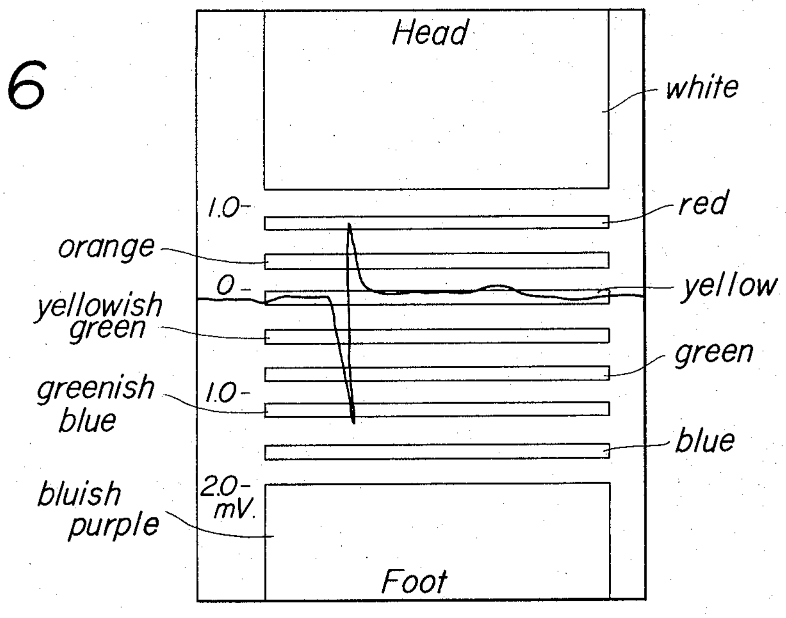
FIG. 6 shows a manner of coloring the Y axis scalar in accordance with the height or depth.

Usually, the sensitivity or deflection in the direction of Y-axis is determined as shown in FIG. 6 which shows the colors at various heights of the deflection in the direction of Y-axis. If the Y-axis scalar is so large that white or bluish-purple appears on the color vector loop, the sensitivity along Y-axis is decreased to suitably increase the spacings between respective colors. On the other hand, where the Y-axis scalar is so small that the difference between adjacent colors is not large the sensitivity along Y-axis must be increased.

Figure 7:
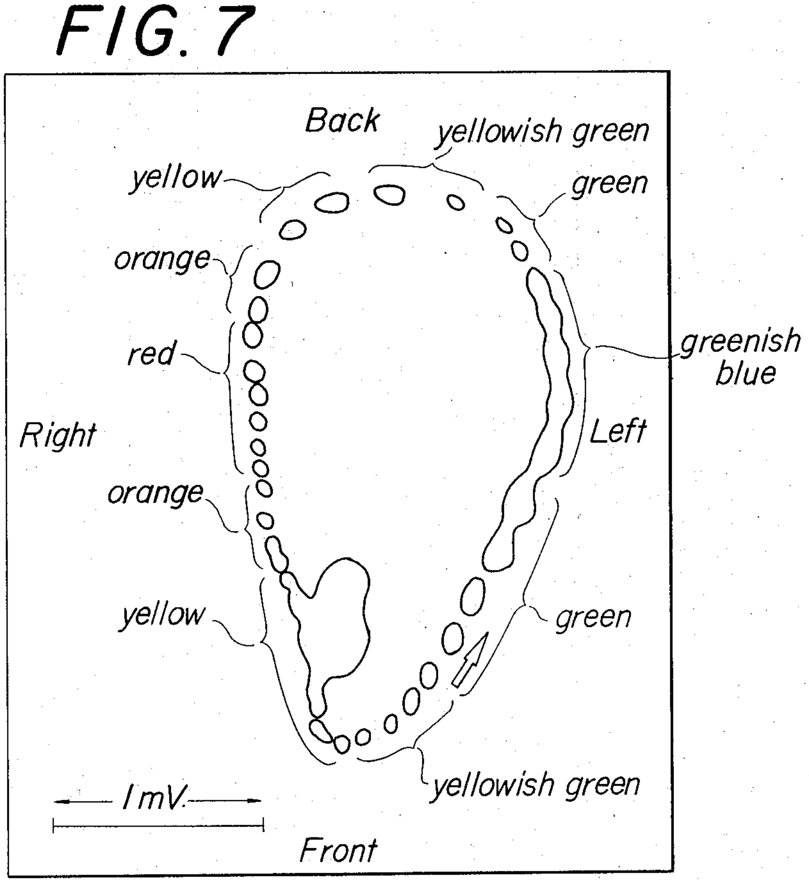
FIG. 7 shows one example of a completed color vectorcardiogram in the horizontal plane.

FIG. 7 shows a resulting color vectorcardiogram in the horizontal plane. The QRS loop shown therein starts from the origin (yellow) and goes downward through yellowish green (−0.4 mV in height) and green (−0.8 mV) to a depth of greenish blue (−1.2 mV). Then the loop goes upward through green (−0.8 mV) and yellowish green (−0.4 mV) to the same level as the origin (yellow). Thereafter, the loop continues to go upward through orange (+0.4 mV) to a height of red (+0.8 mV). Finally, the loop again goes downward through orange (+0.4 mV) back to the origin (yellow). The T loop is almost yellow. This shows that the T loop is nearly horizontal at the same level as the origin.

Figure 8:
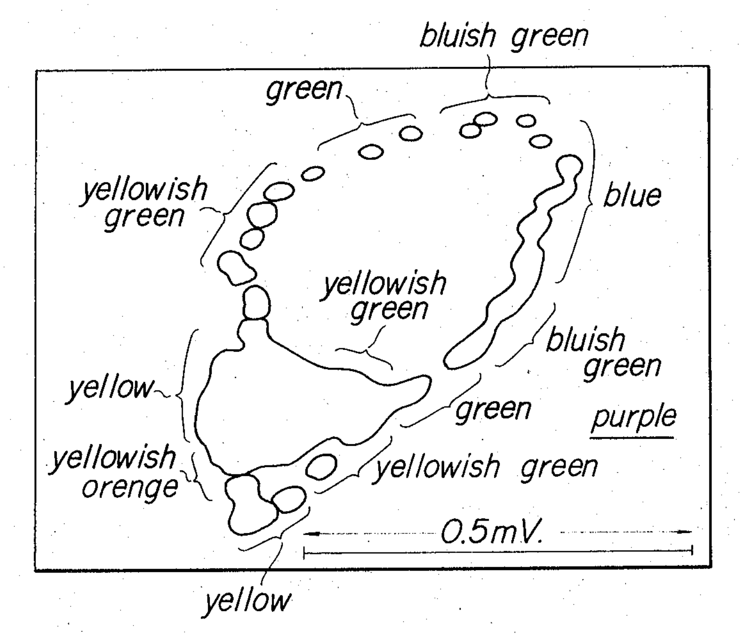
FIG. 8 shows a similar color vectorcardiogram obtained by increasing the sensitivity in the direction of Y-axis and FIG. 9 shows a color vectorcardiogram obtained by photographing a color horizontal vector loop on a color film.

FIG. 8 shows a similar color vector cardiogram in the horizontal plane which is obtained by increasing twice the sensitivity in the direction of Y-axis. In this case, the background of the lowest side in the Y axis direction is colored black in stead of colored bluish purple above. The background was colored by shielding the color vector loop with a black vector loop.

In the vector loop shown in FIG. 8, only the portions of the QRS loop near the origin are yellowish orange (corresponding to g of the a Vf) and the color of other portions varies from green to blue indicating that they are located beneath the origin.

According to a modified embodiment of this invention a color horizontal vector loop is displayed on a fluorescent screen of a color cathode ray tube operating over a wide wavelength band, and the color horizontal vector loop is directly photographed on a color film through a color filter which is replaced for the tomographic filter described above. The circuit arrangement shown in FIG. 2 is also used. In the experiment color films of ASA-160 sold by Eastman Kodak company were used.

Figure 9:
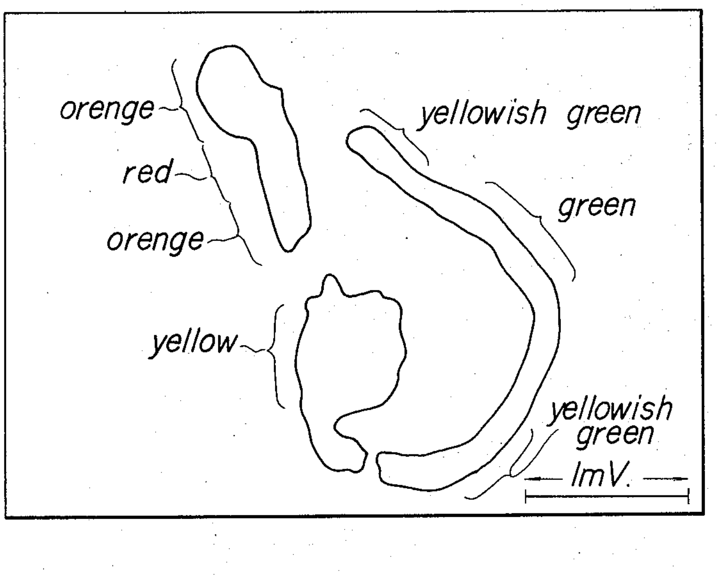

FIG. 9 shows a color vectorcardiogram obtained by this modified method, and the cathode ray tube utilizes a phosphor P7 but is not graduated with any time scale. The QRS loop shown in FIG. 9 starts from the origin (yellow) and goes downward through yellowish green and green. Thereafter, the loop goes upward through yellowish green and orange then goes downward through red and orange back to the origin (yellow). The color tone of the color filter is adjusted such that when the spots of the horizontal vector loop displayed on the fluorescent screen of the color cathode ray tube are viewed through the color filter they will manifest the same brightness for different colors.

Where a new method of medical examination is developed, its utility must be evaluated by considering the quantity of the informations afforded thereby and the labor and apparatus required for carrying out the method. Although the vectorcardiogram gives much informations than the ordinary cardiogram, the former is not yet widely used because it must be analyzed in three different planes. While some attempts have been made to obtain stereographic displays of the vectorcardiogram, such a method can not overcome the problem involved in the current three plane cardiography because of its trouble of recording and filing the stereographic vectorcardiograms. According to this invention, however, these difficulties can be efficiently eliminated by using only the horizontal plane of the present day vectorcardiogram and by coloring the spots of the vector loop.

The labor involved in the method of examination includes, (1) such economical and technical phase as the apparatus, reagents or the like necessary to carry out the method, (2) the labor required for the examination, mainly the work of the operator and (3) the labor required to analyze the result of examination. With recent development of economical power, the weight of phase 1 has been gradually decreased and the phase 2 can also be mechanized due to the progress of engineering. However, it is till difficult to mechanize the work of analyzing the result of examination, especially in the complicated medical field. In other words, it is essential to decrease the work of the operator at the expense of the equipment.

With regard to the quantity of informations provided by the novel method of examination, even if it were possible to reduce the work of analyzing the result, if the quantity of the informations were smaller than that of the conventional three plane method, the utility of the novel method would be decreased. In the diagonosis of the heart desease by means of the vectorcardiogram, where only one plane is used, the horizontal plane give the highest accuracy of diagonosis, and it has been reported that the accuracy amounts to 93 percent of the accuracy of the diagonosis made on the three planes. According to this invention, the heights or depths are displayed by different colors in the same horizontal plane so that it is possible to readily obtain essentially the same degree of accuracy as the three plane method without the necessity of analyzing the result of the horizontal plane together with those of remaining two planes in order to improve the accuracy from 93 to 100 percent.

In order to obtain color vectorcardiograms of high quality with the apparatus described above, it is necessary to reduce as far as possible the effect of the inertia due to the weight of the tomographic or color filter. For this purpose, the filter must be small and of light weight. In one example, the color filter had a height of 23 mm, a width of 34 mm and a weight of 0.6 g. Stripes of various colors, each having a width of 2 mm were closely applied transversely. Accordingly, the image of the vector loop focused on the plane of the color filter was made considerably small. Furthermore, the sensitivity along *X*-axis was suitably adjusted to make small as far as possible the movement of the filter. By these measures it was possible to substantially eliminate the effect of the inertia caused by the color filter.

Although the movements of the upper and lower portions of the filter differ slightly due to the fan like movement thereof, the effect of such slight difference can be minimized by making small as far as possible the image on the filter and by making mall the movement of the filter.

Where a color filter is used, even the same color looks as different colors when passed through the filter dependent upon the brighness of the spots on the cathode ray tube. Accordingly, it is necessary to use an accurate device for equalizing the brightness of the vectorcardiograph. To increase the number of colors of the resulting color vectorcardiogram it is essential to use a fluorescent screen having as far as possible wide wavelength band for the cathode ray tube. Where use is made of a fluorescent screen having a long photopersistency the color vectorcardiogram would be colored also by the persistent spot, so that it is desirable to use a fluorescent screen having as far as possible short photopersistency. In carrying out the invention the colors of the filter were determined such that the brightness is substantially the same for all colors. The colors selected in this manner cooperate with the small movement of the color filter so as to prevent the coloring of the color vector loop due to the photopersistency. While in the foregoing modified embodiment, a P7 fluorescent screen having a large photopersistence was used without using any brightness equalizing device, it is considered better to use a P4 fluorescent screen for the white and black television picture tube from the standpoint of the wavelength band and photopersistency of the fluorescent light.

Finally, with regard to the arrangement of the color stripes for forming the desired color vectorcardiogram, in the foregoing embodiments, a range from the upper height of 1.0 mV to the lower height of 2.0 mV is relatively finely colored and when the scalar exceeds these upper and lower limits the sensitivity along *Y*-axis is adjusted to bring back the scalar into this range. Since the portions near the origin, particularly those above the origin are important for clinicians, the colors at these portions are made to differ greatly.

As above described according to this invention there is obtained a color vectorcardiogram projected on the horizontal plane having successive spots colored with different colors in accordance with vertical height or depth thereby providing a stereographic display.

This single color vectorcardiogram can provide nearly equal informations as the three plane method thereby simplifying and improving the accuracy of the diagonosis of the heart desease.

What is claimed is:

1. A method of preparing a color vectorcardiogram comprising the steps of displaying a horizontal vector loop of a cardiogram on the fluorescent screen of a cathode ray tube of the monochromatic type, photographing the image of the spots of said horizontal vector loop through a tomographic filter, displacing said tomographic filter to different positions in accordance with the vertical scalar and repeating the photographing of said horizontal vector loop through said tomographic filter at said different positions thereby forming a plurality of tomographic vector loops corresponding to different depths, coloring each tomographic vector loop with different colors in accordance with the depth thereof, and superposing respective colored tomographic vector loops one upon the other to form a continuous color vectorcardiogram.

2. The method according to claim 1 wherein said tomographic filter is provided with a plurality of equally spaced apart black stripes of equal width and driven by a galvanometer energized by the output of a vectorcardiograph such that it is driven by the difference between the movements in the directions of Y-axis and X-axis.

3. The method according to claim 2 wherein the sensitivities or deflections in the directions of X and Y axes are adjusted such that the movement of the image of said horizontal vector loop focused on the surface of said tomographic filter is governed solely by the movement in the direction of Y-axis.

4. The method according to claim 1 wherein each tomographic vector loop is colored by superposing it upon an ordinary horizontal plane vector loop and a plurality of colored cellophane sheets, each colored in accordance with the depth, and photographing the superposed assembly with a color film.

5. The method according to claim 4 wherein said ordinary horizontal plane vector loop is graduated with a time scale.

6. A method of preparing a color vectorcardiogram comprising the steps of displaying a horizontal vector loop of a vectorcardiograph on the fluorescent screen of a cathode ray tube said fluorescent screen having a relatively wide wavelength band, photographing said horizontal vector loop on a color film through a color filter which is moved in accordance with the vertical scalar of the vectorcardiograph thereby forming a color vectorcardiogram having spots colored with different colors in accordance with the depth.

7. The method according to claim 6 wherein said filter comprises a plurality of stripes of different colors arranged in parallel close relationship.

8. The method according to claim 6 wherein said color filter is driven by a galvanometer energized by the output of the pickup of a vectorcardiograph such that it is driven by the difference between the movements in the directions of X-axis and Y-axis.

9. Apparatus for preparing a color vectorcardiogram comprising a cathode ray tube having a fluorescent screen, means responsive to the output of a pickup of a vectorcardiograph for displaying a horizontal vector loop of the vectorcardiograph on said fluorescent screen, a photographic camera for photographing the image of said horizontal vector loop, a filter driven by a galvanometer essentially responsive to the vertical component of said output, said filter being located intermediate said fluorescent screen and said photographic camera, and a condenser lens for focusing the image of said horizontal vector loop on the surface of said filter.

10. The apparatus according to claim 9 wherein said cathode ray tube is of the monochromatic type and said filter is a tomographic filter having a plurality of equally spaced apart black stripes.

11. The apparatus according to claim 9 wherein said fluorescent screen of said cathode ray tube has a relatively wide wavelength band and said filter is a color filter comprising a plurality of stripes of different colors which are arranged in parallel close relationship.

* * * * *